April 19, 1938. R. HERRMANN-MÖLLER 2,114,668
HAND DRILL
Filed Nov. 29, 1935
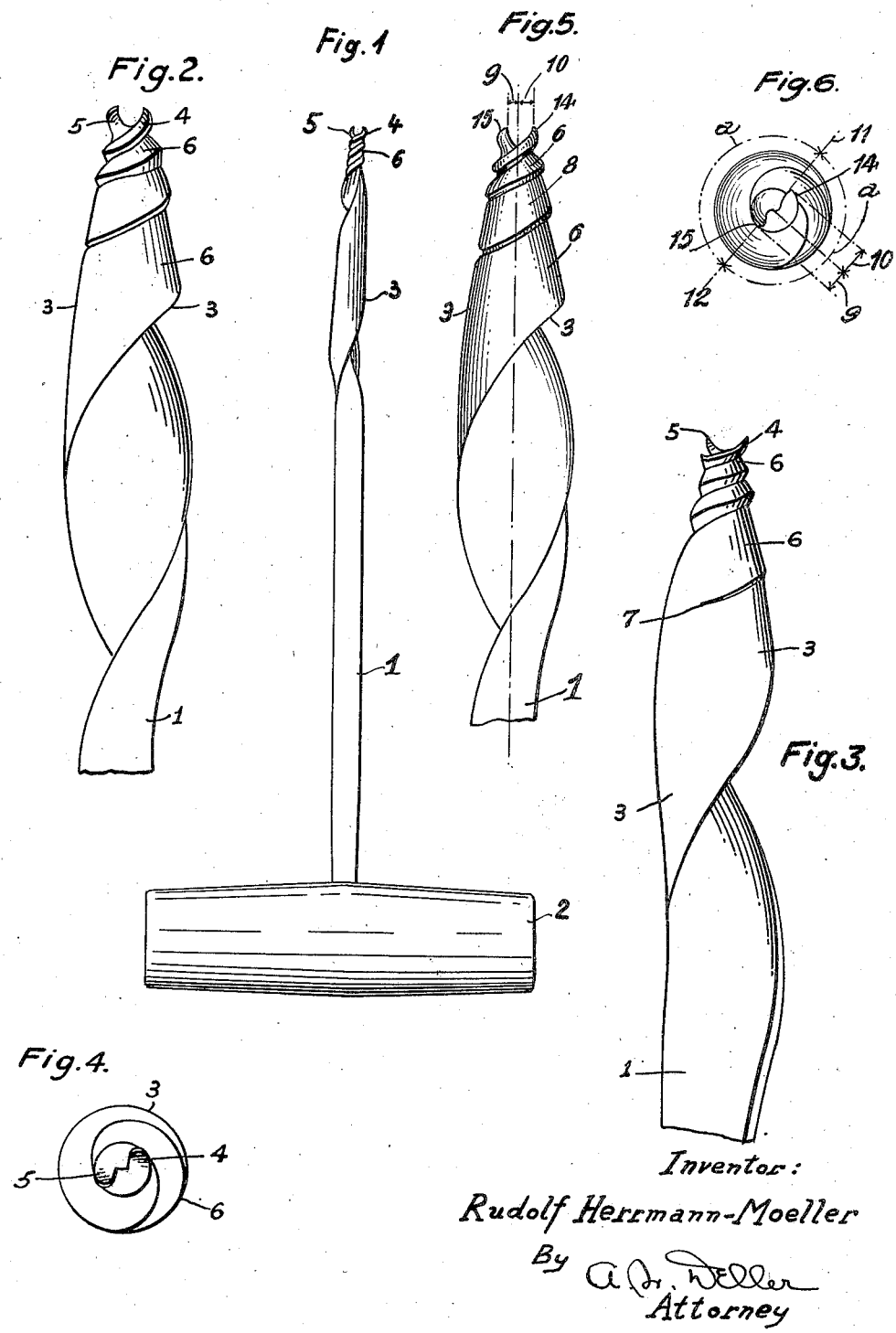
Inventor:
Rudolf Herrmann-Moeller
By A. R. Weller
Attorney Patented Apr. 19, 1938

2,114,668

UNITED STATES PATENT OFFICE 2,114,668

HAND DRILL

Rudolf Herrmann-Möller, Leipzig-Leutzsch, Germany

Application November 29, 1935, Serial No. 51,991
In Germany July 10, 1934

2 Claims. (Cl. 145—116)

This invention relates to a hand-drill especially for drilling wood and, more particularly, to an improved hand-drill having two or more cutting lips or pointed ends lying outside of the drill axis.

There exist already drills provided with two or more pointed ends in which each winding or thread commencing at one of said ends extends equally far rearwardly in the drill shank. In these drills the pitch in the front part which terminates in a pointed end is greater than in the rear portion of the drill which has always the same diameter and the same pitch. Prior to penetrating into the material to be drilled, these conventional drills have to be driven thereinto with the aid of a hammer or the like.

In another type of the known double-thread drills there is at its free end a double-thread centering pin which is strongly reduced in diameter as compared to the likewise double-threaded drill part proper having always the same diameter. In these drills the cutting faces of the centering pin do not pass over into twisted cutting faces of the drill portion proper, but commerce independently from the centering pin only at that place where this pin projects from the core of said drill portion.

The present improved drill is provided in known manner with two or more cutting lips or pointed ends located outside of the drill axis, but is distinguished from the known types by a particular design of the windings for the cutting faces and of the pitch of the same whereby particular advantages are obtained.

According to the principles of the present invention, one of the pointed ends extends with its cutting face, the first portion of which has only a slight pitch, into the main cutting face of the single-thread winding or twist which is worked into the shank and the pitch of which increases more and more in rearward direction, whereas the other cutting edges or faces which extend from the remaining pointed ends and have likewise a slight pitch terminate in the exterior flank of the twist running around the entire circumference of the drill, so that the drill is double-threaded at its front portion and single-threaded at its rear one.

A drill of the described character has the advantage that at the commencement of the drilling operation its pointed ends pull themselves into the material to be drilled so that when the drill is applied relatively small power is required and the employment of a hammer or the like is unnecessary. On the other hand, the rear portion of the drill where there is only one thread and the pitch and diameter of which continually increases rearwardly needs only a small sectional area so that much room is provided for the drilling chips coming from the drilled hole, and jamming of the same is prevented.

The invention is illustrated diagrammatically and by way of example in the accompanying drawing in which:

Fig. 1 illustrates a side elevational view of a hand-drill embodying the principles of the present invention.

Fig. 2 depicts a fragmentary side elevational view of the front portion of the hand-drill shown in Fig. 1 drawn to an enlarged scale;

Fig. 3 shows a view similar to Fig. 2 in which the drill is turned by an angle of 90 degrees;

Fig. 4 is a top elevational view of the front portion of the drill shown in Figs. 2 and 3;

Fig. 5 illustrates a fragmentary side elevational view of the front portion of a modified embodiment of the present invention; and Fig. 6 depicts a diagrammatic top elevational view of the drill shown in Fig. 5.

Referring now to the drawing, the reference character 1 denotes the shank of the drill having a grip or handle 2 and a main cutting face 3. The foremost portion of the operative part of the drill is provided with cutting projections 4 and 5 which are arranged side by side outside of the axis of the drill and have cutting edges of slight pitch pointing into opposite directions. The cutting face of projection 5 passes over into the main cutting face 3 of the single thread twist worked into shank 1. The cutting face of projection 4 extends first like a thread and terminates at interior region 7, in the portion in contact with the bore, of the twist beginning at the projection 5 and extending completely around the shank. Thus, the front portion of the drill is provided with a double thread extending to about one fourth of the twist, while the rear portion of the drill is only single threaded and extends to about three fourths of the twist. The double threaded part at the front portion of the drill has a substantially constant pitch slighter than that of the single threaded rear portion, the pitch of which continuously increases.

It is also to be observed that in the hand-drill embodying the principles of the present invention, the pointed ends preferably are at equal angular distances from each other with respect to the axis of the drill but at different radial distances from said axis. In other words, if imaginary lines were horizontally extended from the pointed ends to the axis of the drill, these lines would enclose equal angles but would have different lengths.

This will be readily observed from Figs. 5 and 6 of the drawing illustrating a modified hand-drill embodying the principles of the invention. This modified hand-drill is in all respects identical with the one illustrated in Figs. 1 to 4, and similar reference characters have been employed to denote corresponding parts, with the difference, however, that pointed ends 14 and 15 are at different radial distances 10 and 9, respectively from the longitudinal axis of the drill. As it clearly appears from Fig. 6, the extensions of lines 11 and 12 enclose equal angles $a$ with each other.

Although the present invention has been described in connection with a preferred embodiment thereof, variations and modifications may be resorted to by those skilled in the art without departing from the principles of the present invention. Thus, it is possible to provide more than two pointed ends, for instance three, but in every case the cutting face of only one pointed end passes over into the main cutting face, whereas all other cutting faces extend into, and terminate in, the exterior flank or circumferential line of the twist that runs around the entire circumference of the drill.

I claim:

1. A hand-drill for drilling wood and similar materials comprising a shank, at least two pointed ends at the front end of said shank and located outside of the drill axis at different radial distances therefrom, and a cutting thread extending rearwardly from each of said pointed ends, one of said threads having only a small pitch in its initial portion merging into a single main cutting thread of continuously increasing pitch and rearwardly extending into said shank, the other cutting threads forming continuation of the other pointed ends merging into and terminating in the outer wall of said main cutting thread whereby a drill having a plurality of threads in the front portion thereof and a single thread in the rear portion thereof is provided.

2. A hand-drill for drilling wood and similar materials comprising a shank, at least two pointed ends at the front end of said shank located outside of the drill axis at different radial distances therefrom and spaced at equal angular intervals apart from one another around the axis of the drill, and a cutting thread extending rearwardly from each of said pointed ends, one of said threads having only a small pitch in its initial portion merging into a single main cutting thread of continuously increasing pitch and rearwardly extending into said shank, the other cutting threads forming continuation of the other pointed ends merging into and terminating in the outer wall of said main cutting thread whereby a drill having a plurality of threads in the front portion thereof and a single thread in the rear portion thereof is provided.

RUDOLF HERRMANN-MÖLLER.